US009708514B2

(12) United States Patent
Myers et al.

(10) Patent No.: US 9,708,514 B2
(45) Date of Patent: Jul. 18, 2017

(54) METHOD OF POLYMERIZING ETHYLENICALLY-UNSATURATED MATERIALS USING IONIZING RADIATION

(71) Applicant: 3M INNOVATIVE PROPERTIES COMPANY, St. Paul, MN (US)

(72) Inventors: Sasha B. Myers, Arden Hills, MN (US); Daniel J. O'Neal, St. Paul, MN (US); Karl B. Richter, St. Paul, MN (US); Thu-Van T. Tran, Maplewood, MN (US); Craig E. Hamer, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/647,924

(22) PCT Filed: Dec. 6, 2013

(86) PCT No.: PCT/US2013/073453
§ 371 (c)(1),
(2) Date: May 28, 2015

(87) PCT Pub. No.: WO2014/093139
PCT Pub. Date: Jun. 19, 2014

(65) Prior Publication Data
US 2015/0299532 A1    Oct. 22, 2015

Related U.S. Application Data

(60) Provisional application No. 61/737,217, filed on Dec. 14, 2012.

(51) Int. Cl.
| | |
|---|---|
| *C09J 133/26* | (2006.01) |
| *C08F 2/38* | (2006.01) |
| *C08F 2/46* | (2006.01) |
| *C08F 220/18* | (2006.01) |
| *C08F 2/54* | (2006.01) |
| *C09J 133/08* | (2006.01) |
| *C09J 133/10* | (2006.01) |
| *C08F 22/10* | (2006.01) |
| *C08F 22/38* | (2006.01) |
| *C09J 133/02* | (2006.01) |

(52) U.S. Cl.
CPC .............. *C09J 133/26* (2013.01); *C08F 2/38* (2013.01); *C08F 2/46* (2013.01); *C08F 2/54* (2013.01); *C08F 22/10* (2013.01); *C08F 22/38* (2013.01); *C08F 220/18* (2013.01); *C09J 133/02* (2013.01); *C09J 133/08* (2013.01); *C09J 133/10* (2013.01)

(58) Field of Classification Search
CPC ...... C09J 133/26; C09J 133/02; C09J 113/08; C09J 133/10; C08F 2/38; C08F 2/46; C08F 2/54; C08F 220/18; C08F 22/10; C08F 22/38
See application file for complete search history.

(56) References Cited

U.S. PATENT DOCUMENTS

| | | | |
|---|---|---|---|
| 3,786,116 A | 1/1974 | Milkovich | |
| 3,842,059 A | 10/1974 | Milkovich | |
| 3,897,295 A | 7/1975 | Dowbenko | |
| 3,991,261 A * | 11/1976 | Gruber | C09D 5/34 |
| | | | 523/176 |

(Continued)

FOREIGN PATENT DOCUMENTS

| | | |
|---|---|---|
| DE | 3625358 | 2/1988 |
| EP | 0886672 | 12/1998 |

(Continued)

OTHER PUBLICATIONS

Lohman: "Haftkleben automobil betrachtet Adhesive bonding from an automotive point of view Produkte Der Lohmann Klebebandgruppe/Products of Lohmann Adhesive Tapes Division",, Apr. 16, 2009 (Apr. 16, 2009), XP055277771, Retrieved from the Internet: URL: http://www.filters.lv/pdf/Automative Industry eng. pdf [retrieved on Jun. 3, 2016].

Schulz; "Functionally Terminal Polymers via Anionic Methods"; Anionic Polymerization; American Chemical Society; vol. 27, 1981, pp. 427-440.

VDA 278, "Thermal Desorption Analysis of Organic Emissions for the Characterization of Non-Metallic Materials for Automobiles;" Oct. 2011, pp. 1-47.

(Continued)

*Primary Examiner* — Sanza McClendon
(74) *Attorney, Agent, or Firm* — James A. Baker

(57) ABSTRACT

Methods of (co)polymerizing ethylenically-unsaturated materials, including the steps of providing a non-deaerated mixture of free radically (co)polymerizable ethylenically-unsaturated material in a batch reactor, exposing the non-deaerated mixture to a source of ionizing radiation for a time sufficient to initiate (co)polymerization of at least a portion of the free radically (co)polymerizable ethylenically-unsaturated material, and allowing the free radically (co)polymerizable ethylenically-unsaturated material to (co)polymerize under essentially adiabatic conditions while continuing to expose the mixture to the source of ionizing radiation for a time sufficient to yield an at least partially (co)polymerized (co)polymer. The ethylenically-unsaturated materials are selected from vinyl-functional monomers, vinyl-functional oligomers, vinyl-functional macromers, and combinations thereof. The mixture is preferably free of thermally-induced or UV-induced free radical polymerization initiators. The source of ionizing radiation may be a gamma ray source, an x ray source, an electron beam source with an emission energy greater than 300 keV, and combinations thereof.

19 Claims, No Drawings

(56) References Cited

U.S. PATENT DOCUMENTS

| | | | |
|---|---|---|---|
| 4,022,855 A | | 5/1977 | Hamblen |
| 4,181,752 A | | 1/1980 | Martens |
| 4,619,979 A | * | 10/1986 | Kotnour .................... C08F 2/02 526/328 |
| 4,732,808 A | | 3/1988 | Krampe |
| 4,737,559 A | | 4/1988 | Kellen |
| 4,810,523 A | | 3/1989 | Williams |
| 4,843,134 A | * | 6/1989 | Kotnour .................... C09J 7/021 526/318.4 |
| 5,015,280 A | | 5/1991 | Kimoto |
| 5,257,491 A | | 11/1993 | Rouyer |
| 5,329,406 A | | 7/1994 | Nakanishi |
| 5,407,971 A | | 4/1995 | Everaerts |
| 5,599,863 A | | 2/1997 | Zimmerman |
| 5,637,646 A | * | 6/1997 | Ellis .......................... C08F 2/02 525/309 |
| 5,986,011 A | | 11/1999 | Ellis |
| 6,461,728 B2 | | 10/2002 | Weiss |
| 6,632,907 B1 | * | 10/2003 | Mizota ................. B01J 19/0053 526/258 |
| 7,385,020 B2 | | 6/2008 | Anderson |
| 2001/0031798 A1 | | 10/2001 | Wright |
| 2003/0051807 A1 | | 3/2003 | Yamaguchi |
| 2003/0092791 A1 | | 5/2003 | Okamitsu |
| 2005/0032926 A1 | | 2/2005 | Okamitsu |
| 2010/0151241 A1 | | 6/2010 | Hardy |
| 2010/0151471 A1 | | 6/2010 | Faham |

FOREIGN PATENT DOCUMENTS

| | | |
|---|---|---|
| WO | WO 93-23224 | 11/1993 |
| WO | WO 02/053602 A1 | 7/2002 |
| WO | WO 2009/129087 | 10/2009 |
| WO | WO 2010-002102 | 1/2010 |
| WO | WO 2010-005655 | 1/2010 |
| WO | WO 2010-005810 | 1/2010 |
| WO | WO 2014-093141 | 6/2014 |
| WO | WO 2014-093142 | 6/2014 |

OTHER PUBLICATIONS

International Search report for PCT International Application No. PCT/US2013/073453, mailed on Mar. 20, 2014, 5 pages.

* cited by examiner

METHOD OF POLYMERIZING ETHYLENICALLY-UNSATURATED MATERIALS USING IONIZING RADIATION

CROSS REFERENCE TO RELATED APPLICATIONS

This application is a national stage filing under 35 U.S.C. 371 of PCT/US2013/073453, filed Dec. 6, 2013, which claims priority to U.S. Application No. 61/737,217, filed Dec. 14, 2012, the disclosure of which is incorporated by reference in its/their entirety herein.

FIELD

This disclosure relates to methods of radiation (co)polymerizing ethylenically-unsaturated materials, more particularly, methods of (co)polymerizing vinyl-functional monomers and/or oligomers using gamma rays, x-rays, and/or high energy electron beam radiation.

BACKGROUND

Copolymers of vinyl-functional monomers that are useful, for example, as adhesives, can be produced by bulk (i.e. solvent-free) free-radical (co)polymerization of a de-aerated (e.g. by sparging with an inert gas) monomer mixture in a batch reactor under essentially adiabatic reaction conditions (see, for example, U.S. Pat. No. 5,986,011). Polymerization typically involves the use of an added compound (i.e. an "initiator") that starts the reaction of and subsequent chain formation by such vinyl-functional monomers. When free-radical initiators are used, the initiation step typically consists of two reactions. In the first reaction, the initiator undergoes cleavage or dissociation upon exposure to an energy source (e.g., heat, ultraviolet light, etc.), causing the formation of at least one radical species of the initiator. In a second step, this radical then combines with a first monomer to form a chain initiating species of the polymer. Once formed, this chain initiating radical propagates the polymerization reaction, incorporating other monomers into a growing polymer chain.

When heat is used as the source of energy to initiate polymerization of free-radically-reactive monomers, thermal initiators such as azo-compounds are typically added to the reactor. When ultraviolet radiation is the source of energy used to initiate free radical polymerization of reactive monomers, photoinitiators that absorb light and form radical species when exposed to energy in the ultraviolet to visible range (250 to 700 nm) are typically employed. Alternatively, electron-beam (e-beam) radiation may be used as the source of energy to initiate (co)polymerization without adding a thermal initiator or a photoinitiator to induce formation of radical species.

SUMMARY

In view of the foregoing, we recognize that there is a need for methods of making (co)polymers of ethylenically-unsaturated materials suitable for use as adhesives, wherein the (co)polymerization takes place substantially adiabatically, without de-aeration of the reaction mixture and in the absence of thermal initiators or photoinitiators, using a source of ionizing radiation in the (co)polymerization process.

Thus, in one aspect, the present disclosure provides methods of free radically (co)polymerizing ethylenically-unsaturated materials, including the steps of (a) providing a non-deaerated mixture of free radically (co)polymerizable ethylenically-unsaturated material in a batch reactor, (b) exposing the non-deaerated mixture to a source of ionizing radiation for a time sufficient to initiate (co)polymerization of at least a portion of the free radically (co)polymerizable ethylenically-unsaturated material, and (c) allowing the free radically (co)polymerizable ethylenically-unsaturated material to (co)polymerize under essentially adiabatic conditions while continuing to expose the mixture to the source of ionizing radiation for a time sufficient to yield an at least partially (co)polymerized (co)polymer. The methods are advantageously carried out in a batch (that is, non-continuous) reactor.

In some exemplary embodiments of the foregoing methods, the mixture can be non-heterogeneous. In certain exemplary embodiments of any of the foregoing methods, the mixture is substantially free of thermally-induced or UV-induced free radical (co)polymerization initiators. In additional exemplary embodiments of any of the foregoing methods, the source of ionizing radiation is selected from a gamma ray source, an x-ray source, an electron beam source having an emission energy of greater than 300 keV, and combinations thereof. Preferably, the ethylenically-unsaturated materials are selected from vinyl-functional monomers, vinyl-functional oligomers, vinyl-functional macromers, and combinations thereof.

Listing of Exemplary Embodiments

In some exemplary embodiments of any of the foregoing methods, the mixture is blanketed with an inert gas to reduce oxygen levels in a vapor space of the batch reactor in step (a), step (b), step (c), or combinations thereof. In further exemplary embodiments of any of the foregoing methods, the mixture is exposed to ionizing radiation for a time sufficient to receive a dose of ionizing radiation up to 100 kiloGray.

In some particular exemplary embodiments of the foregoing methods, the ethylenically-unsaturated materials are comprised of vinyl-functional monomers. In certain such embodiments, the vinyl-functional monomers are comprised of monofunctional unsaturated (meth)acrylate esters of a non-tertiary alkyl alcohol, wherein the non-tertiary alkyl alcohol comprises an alkyl group containing from 1 to about 30 carbon atoms, more preferably 1 to 18 carbon atoms. In certain such embodiments, monofunctional unsaturated (meth)acrylate esters of a non-tertiary alkyl alcohol are selected from the group consisting of isooctyl acrylate, isononyl acrylate, 2-ethylhexyl acrylate, 2-octyl acrylate, 3-octyl acrylate, 4-octyl acrylate, decyl acrylate, dodecyl acrylate, n-butyl acrylate, hexyl acrylate, octadecyl acrylate, methyl acrylate, ethyl acrylate, butyl acrylate, methyl methacrylate, N-butyl methacrylate, 2-methyl butyl acrylate, and mixtures thereof. In some particular embodiments, the free radically (co)polymerizable ethylenically-unsaturated monomers are comprised of difficult to (co)polymerize monomers selected from N-vinyl pyrrolidone, N,N-dimethyl acrylamide, (meth)acrylic acid, acrylamide, N-octyl acrylamide, styrene, vinyl acetate, and combinations thereof.

In certain embodiments of any of the foregoing methods, the mixture further comprises a chain transfer agent. In some such embodiments, the chain transfer agent is selected from the group consisting of carbon tetrabromide, hexanebromoethane, bromotrichloromethane, ethanethiol, isooctylthioglycoate, 2-mercaptoethanol, 3-mercapto-1,2-propanediol, 2-butyl mercaptan, n-octyl mercaptan, t-dodecylmercaptan, 2-ethylhexyl mercaptopropionate, 2-mercaptoimidazole, 2-mercaptoethyl ether, cumene, ethyl acetate, ethanol, 2-propanol, and combinations thereof. In certain such embodiments, the concentration of the chain transfer agent in the mixture is from 0.01% to 20% by weight, based upon the total weight of the mixture. In some particular such embodiments, the concentration of the chain transfer agent in the mixture is no more than about 0.2% by weight, based upon the total weight of the mixture.

In additional or alternative embodiments of any of the foregoing methods, the mixture further comprises a photoinitiator. In some such embodiments, the photoinitiator is selected from the group consisting of acetophenones, substituted alpha-ketols, benzoin ethers, substituted benzoin ethers, aromatic sulfonyl chlorides, 2,4,6-trimethylbenzoyl-diphenyl-phosphineoxide, 2-hydroxy-2-methyl-1-phenyl-propan-1-one, 1-hydroxy-cyclohexyl-phenyl-ketone, 2,2-dimethoxy-1,2-diphenylethan-1-one, bis(2,4,6-trimethylbenzoyl)-phenylphosphineoxide], benzene, (1-methylethenyl)-, homopolymer, Ar-(2-hydroxy-2-methyl-1-oxopropyl), and combinations thereof.

In further exemplary embodiments of any of the foregoing methods, the mixture further comprises a non-reactive diluent selected from the group consisting of plasticizers, tackifiers, particulate fillers, non-volatile organic solvents, and combinations thereof. In some such embodiments, the non-reactive diluent is added at a level of from about 1% to about 25% by weight, based upon the total weight of the mixture.

In certain exemplary embodiments of the foregoing methods including a non-reactive diluent, the non-reactive diluent is selected to include a plasticizer. In some particular such embodiments, the plasticizer is selected from the group consisting of dioctyl phthalate, phosphate esters, and alkyl or aryl functionalized polyalkylene oxides.

In additional exemplary embodiments of any of the foregoing methods including a non-reactive diluent, the non-reactive diluent is selected to include a tackifier. In some particular such embodiments, the tackifier is selected from the group consisting of esters of hydrogenated rosins and synthetic hydrocarbon resins.

In some exemplary embodiments of any of the foregoing methods including a non-reactive diluent, the non-reactive diluent is selected to include a particulate filler. In some particular such embodiments, the particulate filler is selected from the group consisting of surface treated particulates, electrically conductive particulates, metal oxide particulates, and combinations thereof. In certain such embodiments, the particulate filler comprises a population of nanoparticulates having a median particulate diameter less than one micrometer. In further such embodiments, the particulate filler is added at a level of about 1% to about 50% by weight, based upon the total weight of the mixture.

In certain exemplary embodiments of any of the foregoing methods including a non-reactive diluent. the non-reactive diluent is selected to include a non-volatile organic solvent miscible in the mixture in an amount of less than 20% by weight, based on the total weight of the mixture.

In some exemplary embodiments of any of the foregoing methods, the mixture has a concentration of the free radically (co)polymerizable ethylenically-unsaturated monomers less than 3% by weight of the total weight of the mixture at the completion of step (c). In certain such exemplary embodiments, the mixture has a concentration of the free radically (co)polymerizable ethylenically-unsaturated material less than 1% by weight of the total weight of the mixture at the completion of step (c). In other exemplary embodiments of any of the foregoing methods, the mixture has a gel content less than 10% by weight, based on the total weight of the mixture, at the completion of step (c).

In another aspect, exemplary embodiments of the present disclosure provide a pressure sensitive adhesive prepared according to any of the foregoing methods, wherein the pressure-sensitive adhesive exhibits a FOG value, determined according to VDA-278, of no more than 1,000 µg/g, and optionally a VOC value, determined according to VDA-278, of no more than 2,000 µg/g. In some exemplary embodiments, the optical activity of the at least partially (co)polymerized (co)polymer is substantially identical to the optical activity of the mixture comprising free radically (co)polymerizable ethylenically-unsaturated material. In certain exemplary embodiments, a pressure sensitive adhesive article incorporating the pressure sensitive adhesive prepared according to any of the foregoing methods comprises at least one layer of the pressure sensitive adhesive on a major surface of a substrate. Optionally, the pressure sensitive adhesive layer has a thickness of at least 1 mm.

Unexpected Advantages of Some Exemplary Embodiments

The various processes and methods of the present disclosure, in some exemplary embodiments, advantageously provide a continuous or semi-continuous, high-throughput (co)polymerization process useful in making adhesives, more preferably pressure sensitive adhesives, even more preferably hot melt pressure sensitive adhesives. Our calculations show that a 1 MCi source of ionizing radiation could result in throughputs as high as 6 million lb/yr of adhesive product in a highly optimized configuration.

Furthermore, use of ionizing radiation to initiate (co)polymerization can yield (co)polymers which are highly branched and/or cross-linked, and are thus particularly well-suited for adhesive applications. Thus, use of ionizing radiation to initiate (co)polymerization may produce an adhesive, more particularly a pressure sensitive adhesive, even more particularly a hot melt pressure sensitive adhesive, containing low or no volatile organic compounds (VOC), low or reduced FOG, decrease odor, and improved stability.

Also, high-energy photons penetrate deeply into the monomer mixture, eliminating undesirable energy gradients and making large-scale bulk (co)polymerization possible, even under substantially adiabatic conditions. More particularly, use of ionizing radiation to initiate (co)polymerization facilitates carrying out adiabatic bulk (co)polymerization in the absence of added volatile organic solvents (often added to the reaction mixture to control the reaction temperature by evaporative heat removal and reflux into the reaction mixture after heat removal by condensation).

Furthermore, use of ionizing radiation to initiate (co)polymerization of ethylenically-unsaturated materials can be effectively carried out without requiring deaeration or deoxygenation of the reaction mixture (e.g. by sparging the reaction mixture with an inert gas to remove dissolved oxygen which can inhibit initiation of free radical formation), and without added chemical initiators, such as thermal initiators or photoinitiators.

Additionally, thermally- or photo-initiated free radical (co)polymerization generally leaves in the (co)polymerization product a fraction of the residual initiator and initiator fragments which can cause haze, and which may yellow over time. In contrast, the use of ionizing radiation to initiate (co)polymerization generally does not require the addition of a polymerization initiator, as the ionizing radiation itself initiates (co)polymerization. Thus, (co)polymerization using ionizing radiation produces a cleaner reaction product with less haze and yellowing.

Furthermore, the absence of initiators makes the optical activity (absorbance of light) of the final (co)polymer substantially identical to that of the mixture of ethylenically-unsaturated material used as the starting point in the (co) polymerization process, and thus the resulting (co)polymers are generally optically inert and/or optically clear. In some exemplary embodiments, the resulting adhesive may be a liquid optically clear adhesive.

Thus, another advantage associated with use of ionizing radiation to initiate (co)polymerization includes the potential to produce clean and clear (co)polymer adhesives suitable for use in electronic, medical, passenger vehicle interior, and optical applications. Use of ionizing radiation during the (co)polymerization process tends to graft lower molecular weight species to larger polymer networks, reducing residual levels of undesirable extractable materials, such as residual monomers, and other undesirable by-products. (Co)polymers produced with low extractables and no initiators (or their fragments) can be particularly useful in applications where these residuals and by-products are undesirable, such as in skin-contacting medical tapes or low volatile organic compound (VOC) adhesives for use in passenger vehicle (e.g. aircraft, trains, automobiles and boats) interiors.

Various aspects and advantages of exemplary embodiments of the present disclosure have been summarized. The above Summary is not intended to describe each illustrated embodiment or every implementation of the present disclosure. The Detailed Description that follows more particularly exemplifies certain presently preferred embodiments using the principles disclosed herein.

DETAILED DESCRIPTION

Acrylic pressure sensitive adhesives (PSA's) are typically synthesized using a chemical initiator—one that is mixed with monomer(s) and activated at elevated temperature or by exposure to visible/ultraviolet light. These thermal and photo-initiators can be expensive, and the residual initiator or initiator fragments remaining after (co)polymerization can adversely affect adhesive performance over time. Using gamma radiation as the initiation source can reduce or eliminate the need for chemical initiators.

Initiator-free compositions are especially useful for two broad classes of adhesives: optically clear adhesives (OCA's) and low VOC/FOG adhesives (those with low organic emissions). The absence of initiator in ionizing radiation (co)polymerized adhesive compositions makes them as optically clear (and/or optically inert) as their component ethylenically-unsaturated raw materials, generally exhibiting high light transmission, low haze, and low yellowness. The initiator and fragments can also contribute to the adhesive's volatile organic compounds (VOC) or FOG emissions. These components are especially problematic, as they are not easily removed by vacuum during extrusion.

Gamma radiation induces (co)polymerization by directly ionizing the monomer mixture, generating free radicals from which propagation can occur. The depth of penetration and low dose rate of gamma photons are ideal for creating high molecular weight (co)polymers, as initiation occurs throughout the bulk and at a low enough frequency to allow time for long-chain growth. Gamma radiation produces radicals statistically on all species present: difficult-to-polymerize monomers, existing polymer chains, and any other monomers or additives. Thus, incorporation of ethylenically-unsaturated materials with lower reactivity is possible, and short chains can be grafted into a larger polymer network. Ultimately, more highly-branched, multi-functional, lower-residual adhesives can be produced than with chemical initiators.

For ionizing radiation (co)polymerized adhesives, the adhesive properties may be tailored by changing total dose or dose rate (quantity and frequency of free radical generation), rather than relying on compositional changes alone. For example, higher total dose will produce a more cross-linked adhesive, even in the absence of multi-functional monomers. A higher dose rate can generate (co)polymers with higher short-branch content, virtually impossible using standard thermal or photo-initiators.

Although dose can be useful for small adjustments, tailoring (co)polymer properties using dose alone can be a challenge. Target doses must be high enough to ensure nearly complete monomer conversion, but not so high as to cross-link the polymer network—typically ~4 kGy. At low levels of chain transfer agent (CTA), i.e. those typical for traditional UV or thermally-initiated systems, this window is fairly small—1 or 2 kGy. One to two kGy precision is not difficult to attain in an experimental capacity, but would pose a large challenge on a manufacturing scale. By incorporating large quantities of CTA (2-6 times traditional levels), a greatly expanded range of acceptable dose is obtained, creating a robust operational process window suitable for a continuous manufacturing process. Highly converted, low gel adhesives can thus be produced at doses of 4.5 to >45 kGy.

For typical UV- or thermally-initiated polymerizations, formulations containing high quantities of CTA would produce short-chain adhesives with poor performance. Any short chain produced will persist in the final composition, unless, of course, it goes through another transfer event (unlikely). With gamma (co)polymerization, short chains are not "dead". Initiation events occur randomly on the short chains and longer ones, and those free-radicals can combine or provide a site for additional monomer incorporation. Thus, through gamma (co)polymerization, we create high molecular weight, branched (co)polymer structures by combining short chains, longer ones, and monomer. These, and other unexpected results and advantages of various processes of the present disclosure are described in detail below.

Throughout the specification, the recitation of numerical ranges by endpoints includes all numbers subsumed within that range (e.g. 1 to 5 includes 1, 1.5, 2, 2.75, 3, 3.8, 4, and 5). Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should understood that, as used herein:

The terms "about" or "approximately" with reference to a numerical value or a shape means +/−five percent of the numerical value or property or characteristic, but expressly includes the exact numerical value. For example, a temperature of "about" 100° C. refers to a temperature from 95° C. to 105° C., but also expressly includes a temperature of exactly 100° C.

The term "substantially" with reference to a property or characteristic means that the property or characteristic is exhibited to a greater extent than the opposite of that property or characteristic is exhibited. For example, a process that is "substantially" adiabatic refers to a process in which the amount of heat transferred out of a process is the same as the amount of heat transferred into the process, with +/−5%.

The terms "a", "an", and "the" include plural referents unless the content clearly dictates otherwise. Thus, for example, reference to a material containing "a compound" includes a mixture of two or more compounds.

The term "or" is generally employed in its sense including "and/or" unless the content clearly dictates otherwise.

The term "homogeneous" means exhibiting only a single phase of matter when observed at a macroscopic scale.

The term "non-heterogeneous" means "substantially homogeneous"

The terms "(co)polymer" or "(co)polymers" includes homopolymers and copolymers, as well as homopolymers or copolymers that may be formed in a miscible blend, e.g., by co-extrusion or by reaction, including, e.g., transesterification. The term "(co)polymer" includes random, block and star (e.g. dendritic) (co)polymers.

The term "(meth)acrylate" with respect to a monomer, oligomer or means a vinyl-functional alkyl ester formed as the reaction product of an alcohol with an acrylic or a methacrylic acid.

The term "liquid optically clear adhesive composition" means a liquid optically clear adhesive (LOCA) or a precursor composition which may be cured to form a LOCA.

The term "glass transition temperature" or "$T_g$" refers to the glass transition temperature of a (co)polymer when evaluated in bulk rather than in a thin film form. In instances where a (co)polymer can only be examined in thin film form, the bulk form $T_g$ can usually be estimated with reasonable accuracy. Bulk form $T_g$ values usually are determined by evaluating the rate of heat flow vs. temperature using differential scanning calorimetry (DSC) to determine the onset of segmental mobility for the (co)polymer and the inflection point (usually a second-order transition) at which the (co)polymer can be said to change from a glassy to a rubbery state. Bulk form $T_g$ values can also be estimated using a dynamic mechanical thermal analysis (DMTA) technique, which measures the change in the modulus of the (co)polymer as a function of temperature and frequency of vibration.

The term "molecularly same (co)polymer(s)" means (co)polymer(s) that have essentially the same repeating molecular unit, but which may differ in molecular weight, method of manufacture, commercial form, and the like.

The term "cross-linked" (co)polymer refers to a (co)polymer whose molecular chains are joined together by covalent chemical bonds, usually via cross-linking molecules or groups, to form a network (co)polymer. A cross-linked (co)polymer is generally characterized by insolubility, but may be swellable in the presence of an appropriate solvent.

As defined herein, by "essentially adiabatic" it is meant that total of the absolute value of any energy exchanged to or from the reaction mixture during the course of reaction will be less than about 15% of the total energy liberated due to reaction for the corresponding amount of (co)polymerization that has occurred during the time that (co)polymerization has occurred. Expressed mathematically, the essentially adiabatic criterion (for monomer poltmerization) is:

$$\int_{t_1}^{t_2} \sum_{j=1}^{N} |q_j(t)| dt \leq f \cdot \int_{x_1}^{x_2} \Delta H_p(x) dx \qquad (1)$$

where f is about 0.15, $\Delta H_p$ is the heat of (co)polymerization, x=monomer conversion=$(M_O-M)/M_O$ where M is the concentration of the monomer and $M_O$ is the initial monomer concentration, $x_1$ is the (co)polymer fraction at the start of the reaction and $x_2$ is the (co)polymer fraction due to (co)polymerization at the end of the reaction, t is the time. $t_1$ is the time at the start of reaction, $t_2$ is the time at the end of reaction, and $q_j(t)$, wherein j=1 ... N is the rate of energy transferred to the reacting system from the surroundings from all N sources of energy flow into the system.

Examples of energy transfer sources for $q_j(t)$, wherein j=1 ... N include, but are not limited to, heat energy conducted to or from the reaction mixture from the reactor jacket, energy required to warm internal components in the reaction equipment such as the agitator blades and shaft, and work energy introduced from mixing the reacting mixture. In the practice of the present disclosure, having f as close to zero as possible is preferred to maintain uniform conditions within a reaction mixture during a reaction (that is, maintain homogeneous temperature conditions throughout a reaction mixture) which helps to minimize batch-to-batch variations in a particular piece of equipment as well as minimize batch-to-batch variations when reactions are made in batch reactors of differing sizes (that is, uniform scale up or scale down of reaction).

As used herein, a "reaction cycle" is defined as a processing sequence where initiator(s), monomers (which are not optional in the first reaction cycle, but which may be optional in subsequent reaction cycles), non-reactive diluent/filler (which are optional in the first and in subsequent reaction cycles), and other optional component(s) are added to the reaction mixture followed by one or more essentially adiabatic reactions with optional heating between the essentially adiabatic reactions.

As used herein, the term "diluent" specifically excludes volatile solvents, for example, volatile solvents such as toluene, ethyl acetate, and acetone, which are typically removed from the (co)polymer product.

The term "non-reactive" refers to diluents (including fillers) that do not contain free radically reactive ethylenically-unsaturated groups that can co-react with the comonomers of the base (co)polymer, or functionalities that significantly inhibit monomer (co)polymerization or significantly chain transfer during the (co)polymerization of monomers.

The term "layer" means a single stratum formed between two major surfaces. A layer may exist internally within a single web, e.g., a single stratum formed with multiple strata in a single web having first and second major surfaces defining the thickness of the web. A layer may also exist in a composite article comprising multiple webs, e.g., a single stratum in a first web having first and second major surfaces defining the thickness of the web, when that web is overlaid or underlaid by a second web having first and second major surfaces defining the thickness of the second web, in which case each of the first and second webs forms at least one layer. In addition, layers may simultaneously exist within a single web and between that web and one or more other webs, each web forming a layer.

The term "adjoining" with reference to a particular first layer means joined with or attached to another, second layer, in a position wherein the first and second layers are either next to (i.e., adjacent to) and directly contacting each other, or contiguous with each other but not in direct contact (i.e., there are one or more additional layers intervening between the first and second layers).

By using terms of orientation such as "atop", "on", "covering", "uppermost", "underlying" and the like for the location of various elements in the disclosed coated articles, we refer to the relative position of an element with respect to a horizontally-disposed, upwardly-facing substrate. It is not intended that the substrate or articles should have any particular orientation in space during or after manufacture.

By using the term "overcoated" to describe the position of a layer with respect to a substrate or other element of a film of this present disclosure, we refer to the layer as being atop the substrate or other element, but not necessarily contiguous to either the substrate or the other element.

By using the term "separated by" to describe the position of a (co)polymer layer with respect to two inorganic barrier layers, we refer to the (co)polymer layer as being between the inorganic barrier layers but not necessarily contiguous to either inorganic barrier layer.

Exemplary Process Embodiments

Various exemplary embodiments of the present disclosure will now be described. Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

In exemplary embodiments, the present disclosure provides processes for free radically (co)polymerizing ethylenically-unsaturated material using a source of ionizing radiation, substantially in the absence of thermal initiators, optionally in the presence of a non-reactive diluent that can remain in the (co)polymer product. The processes include (a) providing a non-deaerated mixture comprising free radically (co)polymerizable ethylenically-unsaturated material in a batch reactor, (b) exposing the non-deaerated mixture to a source of ionizing radiation for a time sufficient to initiate (co)polymerization of at least a portion of the free radically (co)polymerizable ethylenically-unsaturated material, and (c) allowing the free radically (co)polymerizable ethylenically-unsaturated material to (co)polymerize under essentially adiabatic conditions while continuing to expose the mixture to the source of ionizing radiation for a time sufficient to yield an at least partially (co)polymerized (co)polymer.

In other exemplary embodiments, the present disclosure provides processes for free radically (co)polymerizing vinyl-functional monomers, vinyl-functional oligomers, or a combination thereof, using a source of ionizing radiation, substantially in the absence of thermal initiators, optionally in the presence of a nanoparticulate filler that can remain in the (co)polymer product.

In certain exemplary embodiments of any of the foregoing processes, the mixture can be non-heterogeneous or homogeneous. In certain exemplary embodiments of any of the foregoing processes, the mixture is substantially free of thermally-induced or UV-induced free radical (co)polymerization initiators. In additional exemplary embodiments of any of the foregoing processes, the source of ionizing radiation is selected from a gamma ray source, an x-ray source, an electron beam source having an emission energy of greater than 300 keV, and combinations thereof.

Free Radically (Co)Polymerizable Ethylenically-Unsaturated Materials

The ethylenically-unsaturated materials suitable for use in practicing exemplary methods of the present disclosure are generally selected from vinyl-functional monomers, vinyl-functional oligomers, vinyl-functional macromers, and combinations thereof.

Vinyl-Functional Monomers

A variety of free radically (co)polymerizable monomers can be used according to the method of the present disclosure. Thus, in some exemplary embodiments, the free radically (co)polymerizable ethylenically-unsaturated material is comprised of vinyl-functional monomers, more preferably, vinyl-functional (meth)acrylate monomers.

The identity and relative amounts of such components are well known to those skilled in the art. Particularly preferred among (meth)acrylate monomers are alkyl (meth)acrylates, preferably a monofunctional unsaturated acrylate ester of a non-tertiary alkyl alcohol, wherein the alkyl group contains 1 to about 30 carbon atoms, more preferably 1 to 18 carbon atoms. Included within this class of monomers are, for example, isooctyl acrylate, isononyl acrylate, 2-ethylhexyl acrylate, decyl acrylate, dodecyl acrylate, n-butyl acrylate, hexyl acrylate, octadecyl acrylate, 2-methyl butyl acrylate, and mixtures thereof.

In some presently preferred embodiments, the monofunctional unsaturated (meth)acrylate esters of a non-tertiary alkyl alcohol are selected from the group consisting of isooctyl acrylate, isononyl acrylate, 2-ethylhexyl acrylate, 2-octyl acrylate, 3-octyl acrylate, 4-octyl acrylate, decyl acrylate, dodecyl acrylate, n-butyl acrylate, hexyl acrylate, octadecyl acrylate, methyl acrylate, ethyl acrylate, butyl acrylate, methyl methacrylate, N-butyl methacrylate, 2-methyl butyl acrylate, and mixtures thereof.

In certain exemplary embodiments, the free radically (co)polymerizable ethylenically-unsaturated monomers are comprised of difficult to (co)polymerize monomers selected from N-vinyl pyrrolidone, N,N-dimethyl acrylamide, (meth)acrylic acid, acrylamide, N-octyl acrylamide, styrene, vinyl acetate, and combinations thereof.

Optionally and preferably in preparing a PSA, polar (co)polymerizable monomers can be (co)polymerized with the (meth)acrylate monomers to improve adhesion of the final adhesive composition to metals and also improve cohesion in the final adhesive composition. Strongly polar and moderately polar (co)polymerizable monomers can be used.

Strongly polar (co)polymerizable monomers include but are not limited to these selected from the group consisting of (meth)acrylic acid, itaconic acid, hydroxyalkyl acrylates, cyanoalkyl acrylates, acrylamides, substituted acrylamides, and mixtures thereof. A strongly polar (co)polymerizable monomer preferably constitutes a minor amount, for example, up to about 25 weight % of the monomer, more preferably up to about 15 weight %, of the monomer mixture. When strongly polar (co)polymerizable monomers are present, the alkyl acrylate monomer generally constitutes a major amount of the monomers in the acrylate-containing mixture, for example, at least about 75% by weight of the monomers. Moderately polar (co)polymerizable monomers include, but are not limited to, those selected from the group consisting of N-vinyl pyrrolidone, N,N-dimethyl acrylamide, acrylonitrile, vinyl chloride, diallyl phthalate, and mixtures thereof. A moderately polar (co)polymerizable monomer preferably constitutes a minor amount, for example, up to about 40 weight %, more preferably from about 5 weight % to about 40 weight %, of the monomer mixture. When moderately polar (co)polymerizable monomers are present, the alkyl acrylate monomer generally constitutes at least about 60 weight % of the monomer mixture.

Vinyl-Functional Oligomers and Macromers

Macromonomers (macromers) are another ethylenically-unsaturated material useful in certain embodiments of the present disclosure. Described in U.S. Pat. No. 4,732,808 is the use of free-radically (co)polymerizable macromonomers having the general formula X—(Y)$_n$—Z wherein:

X is a vinyl group (co)polymerizable with other monomer(s) in the reaction mixture;

Y is a divalent linking group; where n can be zero or one; and

Z is a monovalent (co)polymeric moiety having a glass transition temperature, T$_g$, greater than about 20° C., and a weight average molecular weight in the range of about 2,000 to about 30,000 and being essentially unreactive under thermally initiated (co)polymerization conditions.

These macromonomers are generally used in mixtures with other (co)polymerizable monomer(s). A preferred macromonomer described in U.S. Pat. No. 4,732,808 can be further defined as having an X group which has the general formula:

$$\begin{array}{c} R \quad R' \\ | \quad | \\ C{=}C{-} \\ | \\ H \end{array}$$

wherein R is a hydrogen atom or a —COOH group and R' is a hydrogen atom or methyl group. The double bond between the carbon atoms provides a (co)polymerizable moiety capable of (co)polymerizing with the other monomer(s) in the reaction mixture.

A preferred macromonomer includes a Z group which has the general formula:

$$-\!\!\left(\!\!\begin{array}{c} R^2 \\ | \\ C \\ | \\ R^4 \end{array}\!\!-CH_2\!\!\right)_{\!\!n}\!\!-R^3$$

wherein R$^2$ is a hydrogen atom or a lower alkyl group (typically C$_1$ to C$_4$), R$^3$ is a lower alkyl group (typically C$_1$ to C$_4$), n is an integer from 20 to 500 and R$^4$ is a monovalent radical selected from the group consisting of:

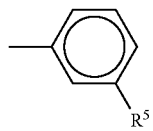

and —CO$_2$R$^6$ wherein R$^5$ is a hydrogen atom or a lower alkyl group (typically C$_1$ to C$_4$) and R$^6$ is a lower alkyl group (typically C$_1$ to C$_4$).

Preferably, the macromonomer has a general formula selected from the group consisting of:

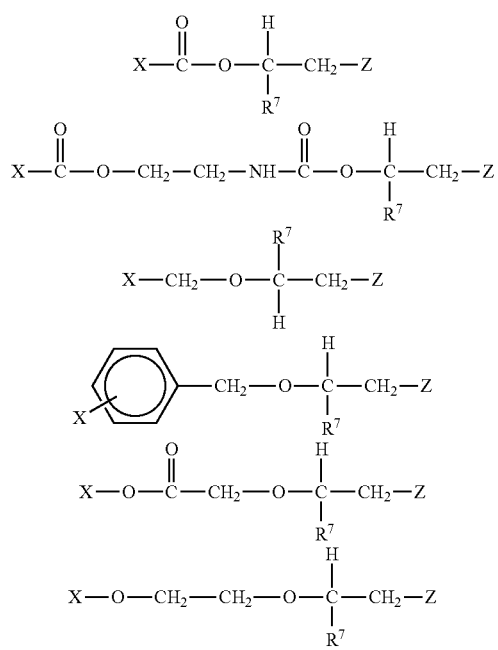

wherein R$^7$ is a hydrogen atom or lower alkyl group (typically C$_1$ to C$_4$).

Preferred macromonomers are functionally terminated (co)polymers having a single functional group (the vinyl group) and are sometimes identified as "semitelechelic" (co)polymers. (Vol. 27 "Functionally Terminal Polymers via Anionic Methods" D. N. Schultz et al., pages 427-440, *Anionic Polymerization*, American Chemical Society [1981]). Such macromonomers are known and may be prepared by the methods disclosed by Milkovich et al. in U.S. Pat. Nos. 3,786,116 and 3,842,059. As disclosed therein, vinyl terminated macromonomer is prepared by anionic (co)polymerization of (co)polymerizable monomer to form a living (co)polymer. Such monomers include those having an olefinic group, such as the vinyl-containing compounds. Living (co)polymers are conveniently prepared by contacting the monomer with an alkali metal hydrocarbon or alkoxide salt in the presence of an inert organic solvent which does not participate in or interfere with the (co)polymerization process. Monomers which are susceptible to anionic (co)polymerization are well known. Illustrative species include vinyl aromatic compounds such as styrene, alpha-methyl styrene, vinyl toluene and its isomers or non-aromatic vinyl compounds such as methyl methacrylate. Other monomers susceptible to anionic (co)polymerization are also useful.

The purpose of using a (co)polymerizable macromonomer includes but is not limited to enabling hot-melt coating of the PSA, for example, by increasing the cohesive strength of the cooled extruded sheet PSA, e.g. by the interaction of the pendant Z moieties on the (co)polymer backbone. The amount of macromonomer used is generally within the range of about 1% to about 30%, preferably about 1% to about 7%, of the total weight of monomers. The optional use of such macromonomers is included within the scope of the present disclosure. A particular advantage of some exemplary embodiments of the present disclosure is the ability to successfully (co)polymerize said macromonomers into the (co)polymer backbone.

Optional Materials

Various optional materials may be added to the reaction mixture used in the processes of the present disclosure before, during, or after any one or more of step (a), (b), and/or (c). Some optional materials, such as chain transfer agents, cross-linkers, photoinitiators, and the like, may react with one or more of the ethylenically-unsaturated material in the reaction mixture, and are preferably added to the reaction mixture before step (a), during step (a), during step (b), during step (c), or a combination thereof.

Optional Chain Transfer Agent(s)

Chain transfer agents, which are well known in the (co)polymerization art, may also be included in any of the processes of the present disclosure, for example, to control the molecular weight or other (co)polymer properties. The term "chain transfer agent" as used herein also includes "telogens." Suitable chain transfer agents for use in exemplary methods of the present disclosure include but are not limited to those selected from the group consisting of carbon tetrabromide, hexanebromoethane, bromotrichloro-methane, ethanethiol, isooctylthioglycoate, 2-mercaptoethanol, 3-mercapto-1,2-propanediol, 2-butyl mercaptan, n-octyl mercaptan, t-dodecylmercaptan, 2-ethylhexyl mercaptopropionate, 2-mercaptoimidazole, 2-mercaptoethyl ether, cumene, ethyl acetate, ethanol, 2-propanol, and combinations thereof.

Depending on the reactivity of a particular chain transfer agent and the amount of chain transfer desired, typically from 0.01% to 25% by weight of chain transfer agent is used, based upon the total weight of ethylenically-unsaturated (co)polymerizable material used in the mixture. More preferably, from about 0.025 wt. % to about 20.0 wt. % of chain transfer agent is used, based upon the total weight of ethylenically-unsaturated (co)polymerizable material used in the mixture. Most preferably, from about 0.04 wt. % to about 15 wt. % of chain transfer agent is used, based upon the total weight of ethylenically-unsaturated (co)polymerizable material used in the mixture.

Optional Crosslinker(s)

Cross-linking may also be used in the processes of the present disclosure. For example, in the art of hot-melt PSA manufacture, PSAs often require a curing step after they have been extruded in sheet form in order to give them good bond strength and toughness. This step, known as post curing, usually comprises exposing the extruded sheet to some form of radiant energy, such as electron beam, or ultraviolet light with the use of a chemical cross-linking agent.

Thus, one or more crosslinker(s) may be may be added to the reaction mixture used in the processes of the present disclosure before, during, or after any one or more of step (a), (b), and/or (c). Examples of suitable cross-linking agents or cross-linkers include but are not limited to those selected from the groups consisting of hydrogen abstraction type photo-cross-linkers such as those based on benzophenones, acetophenones, anthraquinones, and the like. These cross-linking agents can be (co)polymerizable or non-(co)polymerizable.

Examples of suitable non-(co)polymerizable hydrogen abstraction cross-linking agents include benzophenone, anthraquinones, and radiation-activatable cross-linking agents such as those described in U.S. Pat. No. 5,407,971. Such agents have the general formula:

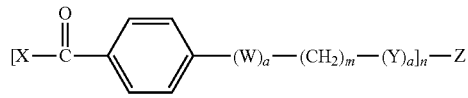

wherein W represents —O—, —N—, or —S—; X represents $CH_3$— or phenyl; Y represents a ketone, ester, or amide functionality; Z represents a polyfunctional organic segment that contains no hydrogen atoms more photo-abstractable than hydrogen atoms of a (co)polymer formed using the cross-linking agent; m represents an integer from 0 to 6; "a" represents 0 or 1; and n represents an integer 2 or greater. Depending on the amount of cross-linking desired and the efficiency of the particular cross-linker used, non-(co)polymerizable cross-linking agents are typically included in the amount of about 0% to about 10%, and preferred in the range of about 0.05% to about 2%, based on the total weight of the ethylenically-unsaturated material (e.g. monomers).

Examples of suitable (co)polymerizable hydrogen abstraction cross-linking compounds include mono-ethylenically-unsaturated aromatic ketone monomers free of orthoaromatic hydroxyl groups.

Examples of suitable free-radically (co)polymerizable cross-linking agents include but are not limited to those selected from the group consisting of 4-acryloxybenzophenone (ABP), para-acryloxyethoxybenzophenone, and para-N-(methacryloxyethyl)-carbamoylethoxy-benzophenone. (Co)polymerizable chemical cross-linking agents are typically included in the amount of about 0% to about 2%, and preferred in the amount of about 0.025% to about 0.5%, based on the total weight of monomer(s). Other useful (co)polymerizable cross-linking agents are described in U.S. Pat. No. 4,737,559.

Optional Photoinitiator(s)

In any of the processes of the present disclosure, the mixture may further comprise a photoinitator added to the reaction mixture before, during, or after any one or more of step (a), (b), and/or (c). Preferably, the photoinitiator is also an ultraviolet radiation cross-linker. The optional photoinitiator may be added to the reaction mixture used in the processes of the present disclosure before, during, or after any one or more of step (a), (b), (c).

Although the optional photoinitiator(s) may be added before or during step (c), the photoinitiators used in the present disclosure are normally not intended to react with the ethylenically-unsaturated material during the (co)polymerization process initiated using a source of ionizing radiation as carried out in steps (a)-(c). In some exemplary processes of the present disclosure, one or more photoinitiators are added to the reaction mixture for use in initiating a subsequent photo-polymerization or photo-curing process, for example, during or after coating of the (co)polymer produced in the ionizing radiation-initiated (co)polymerization processes of the present disclosure onto a substrate. Such subsequent photo-curing processes are particularly well-suited for curing hot melt pressure sensitive adhesive layers. In such embodiments, it is presently-preferred that the optional photoinitiator is added to the (co)polymer after completion of step (c).

Useful classes of photoinitiators include substituted acetophenones such as benzyl dimethyl ketal and 1-hydroxycyclohexyl phenyl ketone, substituted alpha-ketols such as 2-methyl-2-hydroxypropiophenone, benzoin ethers such as benzoin methyl ether, benzoin isopropyl ether, substituted benzoin ethers such as anisoin methyl ether, and aromatic sulfonyl chlorides, and possibly photoactive oximes.

Particularly useful photoinitiators are commercially available under the trade designations DAROCURE TPO [CAS Name: 2,4,6-Trimethylbenzoyl-diphenyl-phosphineoxide], DAROCURE 1173 [CAS Name: 2-Hydroxy-2-methyl-1-phenyl-propan-1-one; CAS No.: 7473-98-5], IRGACURE 184 [CAS Name: 1-Hydroxy-cyclohexyl-phenyl-ketone; CAS No.: 947-19-3], IRGACURE 651 [CAS Name: 2,2-Dimethoxy-1,2-diphenylethan-1-one; CAS No. 24650-42-8], and IRGACURE 819 [CAS Name: Bis(2,4,6-trimethyl-benzoyl)-phenylphosphineoxide], all manufactured by Ciba Specialty Chemicals, a subsidiary of BASF Corp. (Florham Park, N.J.); and ESACURE KK [CAS Name: benzene, (1-methylethenyl)-, homopolymer, Ar-(2-hydroxy-2-methyl-1-oxopropyl) derivatives; CAS No.: 163702-01-0] manufactured by Lamberti USA, Inc. (Hungerford, Tex.).

The photoinitiator may be used in an amount from about 0.001 to about 5.0 parts by weight per 100 parts of the total ethylenically-unsaturated material in the reaction mixture; preferably from about 0.01 to about 5.0 parts by weight per 100 parts of the total ethylenically-unsaturated material in the reaction mixture; and more preferably in an amount from 0.1 to 0.5 parts by weight per 100 parts of the total ethylenically-unsaturated material in the reaction mixture.

Optional Non-Reactive Diluent and/or Filler

Non-reactive diluents or fillers can be used advantageously in any of the processes of the present disclosure to reduce the adiabatic temperature rise during reaction by absorbing a portion of the heat of reaction. Non-reactive diluents may also reduce the viscosity of the melted (co)polymer product and/or advantageously affect the final properties of the (co)polymer product. Advantageously, the non-reactive diluent or filler can remain in the finished (co)polymer product in its usable form.

Suitable non-reactive diluents are generally non-volatile (that is, they remain present and stable under (co)polymerization and processing conditions) and are compatible (miscible) in the mixture. "Non-volatile" diluents typically generate less than 3% VOC (volatile organic content) during (co)polymerization and processing. The term "compatible" refers to diluents that exhibit no gross phase separation from the base (co)polymer when blended in the prescribed amounts, and that, once mixed with the base (co)polymer, do not significantly phase separate from the base (co)polymer upon aging. Non-reactive diluents include, for example, materials which can raise or lower the glass transition temperature ($T_g$) of the (co)polymer product, including tackifiers such as synthetic hydrocarbon resins and plasticizers such as phthalates.

The non-reactive diluent can also serve as a non-volatile "solvent" for incompatible mixtures of comonomers. Such incompatible comonomer mixtures typically require a volatile reaction medium, such as an organic solvent to promote effective (co)polymerization. Unlike volatile reaction media, the non-reactive diluent does not have to be removed from the (co)polymer product.

Preferred non-reactive diluents include non-volatile organic solvents, plasticizers (flexibilizers) and tackifiers. Appropriate amounts of non-reactive diluent will be familiar to those skilled in the art, and will depend upon numerous factors including, for example, the monomer(s) utilized, the type of non-reactive diluent, and the end use of the (co)polymer product. Typically, however, the amount of non-reactive diluent used is at least about 1 percent by weight, 2 wt. %, 5 wt. %, 7.5 wt. % or even about 10 wt. %; and no more than about 50% by weight, less than 40 wt. %, less than 30 wt. %, less than 20 wt. %, or even less than 10 wt. %, based upon the total weight of the reaction mixture or the finished (co)polymer.

Optional Organic Solvent

In many exemplary processes of the present disclosure, free-radical (co)polymerization can take place without added organic solvents, that is, true bulk (co)polymerization takes place in which the (co)polymer formed as well as the ethylenically-unsaturated starting materials in the reaction mixture are all mutually miscible or even soluble with each other. However, the ethylenically-unsaturated starting materials, particularly polar monomers and/or oligomers and/or macromers, may in some cases require a solvent in order to (co)polymerize. For example, acrylamides are polar monomers which can be advantageously dissolved in a small amount of polar organic solvent in order to make them miscible with isooctyl acrylate. Organic solvents may also be used to reduce the viscosity of the (co)polymer at the end of the (co)polymerization to facilitate draining or subsequent processing.

Therefore, any of the processes of the present disclosure may include the use of organic solvents that are nonreactive with the ethylenically-unsaturated material in the free radical (co)polymerization being carried out. Useful solvents are those that are miscible in the reaction mixture including but not limited to organic solvents such as toluene, hexane, pentane, and ethyl acetate. Presently preferred organic solvents are generally non-volatile, that is, they have normal boiling points above about 100° C., more preferably above about 125° C., 150° C., 175° C., 200° C., or even 225° C.

Presently preferred processes preferably employ no more than about 20 weight percent, 15 wt. %, 10 wt. %, 5 wt. %, 1 wt. %, of organic solvent, which is preferably a non-volatile organic solvent, based on the total weight of the reaction mixture.

Typically, however, any added organic solvent, and more particularly any volatile organic solvent, is preferably substantially removed from the end product, for example, by evaporation, vacuum stripping, and the like. It is presently preferred that organic solvents and more particularly volatile organic solvents comprise no more than about 20 weight percent, 15 wt. %, 10 wt. %, 5 wt. %, 1 wt. %, of the finished (co)polymer material, based on the total weight of the finished (co)polymer material.

Optional Plasticizers

A plasticizer may optionally be used in any of the processes of the present disclosure. Useful plasticizers include, for example, polyalkylene oxides having weight average molecular weights of 150 to about 5,000, or 150 to 1,500, such as polyethylene oxides, polypropylene oxides, polyethylene glycols; alkyl or aryl functionalized polyalkylene oxides, such as that commercially available under the trade designation "PYCAL 94" from CRODA, Inc. (Edison, N.J.); a phenyl ether of polyethylene oxide); monomethyl ethers of polyethylene oxides; monomeric adipates such as dioctyl adipate, dibutyl adipate, dibutoxyethoxyethyl adipate, and dibutoxypropoxypropyl adipate; (co)polymeric adipates such as polyester adipates; citrates such as acetyltri-n-butyl citrate; phthalates such as butyl benzylphthalates, dibutyl phthalate, diisoctyl phthalate; trimellitates; sebacates such as dibutylsebacate; myristates such as isopropyl myristate; polyesters such as those commercially available under the trade designation "PARAPLEX" from C.P. Hall Co. (Chicago, Ill.); phosphate esters such as those commercially available under the trade designation "SANTICIZER" from Ferro Corp. (Mayfield Heights, Ohio), for example, 2-ethylhexyl diphenylphosphate and t-butylphenyl diphenylphosphate); glutarates such as that commercially available from C.P. Hall Co. under the trade designation "PLASTHALL 7050" (a dialkyl diether glutarate); other (co)polymeric plasticizing agents such as polyurethanes, polyureas, polyvinylethers, polyethers, polyacrylates; and mixtures thereof.

Presently preferred plasticizers include, for example, dioctyl phthalate, phosphate esters, and alkyl or aryl functionalized polyalkylene oxides.

Typically, plasticizer will added at a level of about 1% to about 50% by weight (preferably, about 1% to about 25% by weight, more preferably about 1% to about 15% by weight), based upon the total weight of the reaction mixture or finished (co)polymer material.

Optional Tacklers

A tackifier may optionally be used in any of the processes of the present disclosure. Useful tackifiers include, for example, terpene phenolics, rosins, rosin esters, esters of hydrogenated rosins, synthetic hydrocarbon resins and combinations thereof. Preferred tackifiers include, for example, esters of hydrogenated rosins and synthetic hydrocarbon resins. Typically, tackifier will added at a level of about 1% to about 50% by weight (preferably, about 1% to about 25% by weight, more preferably about 1% to about 15% by weight), based upon the total weight of the reaction mixture or finished (co)polymer material.

Optional Fillers/Nanoparticulates

In any of the processes of the present disclosure, the non-reactive diluent may be comprised of a particulate filler. In certain exemplary embodiments, the particulate filler is selected from the group consisting of surface treated particulates, electrically conductive particulates, metal oxide particulates, and combinations thereof.

Useful fillers are preferably non-reactive such that they do not contain free radically reactive ethylenically-unsaturated groups that can co-react with the ethylenically-unsaturated materials of the reaction mixture, or functionalities that significantly inhibit the (co)polymerization of the reaction mixture, or significantly which affect chain transfer during the (co)polymerization of the reaction mixture. Fillers can, for example, be used to reduce the cost or improve the performance (e.g. the cohesive strength) of the finished (co)polymer material.

Useful fillers include, for example, clay, talc, dye particles and colorants (for example, $TiO_2$ or carbon black), glass beads, metal oxide particles, silica particles, and surface-treated silica particles (such as Aerosil R972 available from Degussa Corporation (Parsippany, N.J.). The filler can also comprise conductive particles (see, for example, U.S. Patent Application Pub. No. 2003/0051807) such as carbon particles or metal particles of silver, copper, nickel, gold, tin, zinc, platinum, palladium, iron, tungsten, molybdenum, solder or the like, or particles prepared by covering the surface of these particles with a conductive coating of a metal or the like.

It is also possible to use non-conductive particles of a (co)polymer such as polyethylene, polystyrene, phenol resin, epoxy resin, (meth)acrylic resin, phenolic resin, benzoguanamine resin, or glass beads, silica, graphite or a ceramic, whose surfaces have been covered with a conductive coating of a metal or the like. Presently preferred fillers include, for example, hydrophobic fumed silica particles, electrically conductive particles, and metal oxide particles.

In additional exemplary embodiments of any of the foregoing processes, the mixture may further include a population of inorganic nanoparticulates having a population median particle diameter of less than one micrometer. In some such exemplary embodiments, the inorganic nanoparticulates are metal oxide particulates selected from titanium dioxide, aluminum oxide, silicon dioxide, indium oxide, tin oxide, zinc oxide, zirconium oxide, and combinations thereof. The inorganic nanoparticulates may be distributed, preferably homogeneously distributed, in the mixture before, during, or after completion of the polymerization step, or combinations thereof.

Appropriate amounts of filler will be familiar to those skilled in the art, and will depend upon numerous factors including, for example, the monomer(s) utilized, the type of filler, and the end use of the (co)polymer product. Typically, filler will be added at a level of about 1% to about 50% by weight (preferably, about 2 wt. % to about 30 wt. %; more preferably about 3 wt. % to about 20 wt. %), based upon the total weight of the reaction mixture or finished (co)polymer material.

Optional (Co)Polymer(s)

Optionally, one or more (co)polymer(s) can be dissolved in the reaction mixture prior to the first essentially adiabatic reaction cycle. Alternatively and/or additionally, the optional (co)polymer(s) may be included in subsequent essentially adiabatic reaction cycles. Such (co)polymer(s) may be included to modify the molecular weight distribution, molecular weight, or properties of the final (co)polymer product after reacting is complete and generally will be non-reactive during the (co)polymerization of the inventive process. The use of (co)polymer syrups to make (meth)acrylic (co)polymers is explained, for example, in U.S. Pat. No. 4,181,752.

Although it is not required, the (co)polymer generally will be comprised of, or otherwise compatible with, the same ethylenically unsaturated materials as those used in the reaction mixture. Preferably, the (co)polymer(s) are compatible with the monomer(s), oligomer(s), macromer(s), optional chain transfer agent(s), optional cross-linker(s), optional photoinitiator(s), and the like, added to the reaction mixture.

The optional (co)polymer(s) added to the reaction mixture is typically added in an amount from at least about 1% to at most about 50% by weight; at least about 3 wt. % to at most about 30 wt. %; or at least about 5 wt. % to at most about 20 wt. %, based on the total weight of the reaction mixture or finished (co)polymer material.

Ionizing Radiation Sources

In exemplary embodiments of the present disclosure, a source of ionizing radiation is used to initiate polymerization of the mixture of ethylenically-unsaturated material. Any conventional source of penetrating ionizing radiation may be employed, i.e., any source of low LET (linear energy transfer) radiation which is capable of extracting protons from the monomers to create free radicals which propagate to form (co)polymer chains. The known types of ionizing radiation include, for example, gamma rays and X-rays. Thus, the source of ionizing radiation may be a gamma ray source, an x-ray source, an electron beam source with an emission energy greater than 300 keV, and combinations thereof.

It is presently preferred to employ gamma radiation as the ionizing radiation. Suitable sources of gamma radiation are well known and include, for example, radioisotopes such as cobalt-60 and cesium-137. Generally, suitable gamma ray sources emit gamma rays having energies of 400 keV or greater. Typically, suitable gamma ray sources emit gamma rays having energies in the range of 500 keV to 5 MeV. Examples of suitable gamma ray sources include cobalt-60 isotope (which emits photons with energies of approximately 1.17 and 1.33 MeV in nearly equal proportions) and cesium-137 isotope (which emits photons with energies of approximately 0.662 MeV). The distance from the source can be fixed or made variable by changing the position of the target or the source. The flux of gamma rays emitted from the source generally decays with the square of the distance from the source and duration of time as governed by the half-life of the isotope.

Once a dose rate has been established, the absorbed dose is accumulated over a period of time. During this period of time, the dose rate may vary if the ethylenically-unsaturated materials are in motion or other absorbing objects pass between the source and sample. For any given piece of equipment and irradiation sample location, the dose delivered can be measured in accordance with ASTM E-1702 entitled "Practice for Dosimetry in a Gamma Irradiation Facility for Radiation Processing". Dosimetry may be determined per ASTM E-1275 entitled "Practice for Use of a Radiochromic Film Dosimetry System" using GEX B3 thin film dosimeters.

Thus, in certain exemplary embodiments, the reaction mixture is exposed to ionizing radiation for a time sufficient to receive a dose of ionizing radiation up to 100 kiloGray, up to 90 kiloGray, up to 80 kiloGray, up to 70 kiloGray, up to 60 kiloGray, or up to 50 kiloGray. In further exemplary embodiments, the mixture is exposed to ionizing radiation for a time sufficient to receive a dose of ionizing radiation of at least 5 kiloGray, at least 10 kiloGray, at least 20 kiloGray, at least 30 kiloGray, at least 40 kiloGray, or even at least 50 kiloGray.

Reactors

A batch reactor may be used advantageously in practicing the methods of the present disclosure. By reacting batch wise it is meant that the (co)polymerization reaction occurs in a vessel where product is drained at the end of the reaction, not continuously while reacting. The raw materials can be charged to the vessel at one time prior to reacting, in steps over time while reacting, or continuously over a time period while reacting, and the reaction is allowed to proceed for the necessary amount of time to achieve, in this case, (co)polymer properties including the desired (co)polymerization amount, molecular weight, etc. If necessary, additives can be mixed into the reaction mixture prior to draining. When the processing is complete, the product is drained from the reaction vessel.

For reaction mixtures including a non-reactive diluent, the batch reactor can be a tube or pipe through which the reaction mixture flows, but bulk polymerization is advantageously carried out by irradiating the reaction mixture in a discrete sealed container, such as a drum or tote.

For small-scale production, the batch reactor may advantageously be selected to be a sealable container, such as a sealable vial, bottle, flask, can, pail, and the like. Sealable glass containers are presently preferred, although plastic or metal containers may also be used. For intermediate-scale production, the batch reactor may advantageously be selected to be a sealable bucket, drum or tote. Preferably, the sealed container is placed in a temperature control apparatus, for example, a water bath, cold box, refrigerator, and the like. Preferably, the temperature control apparatus is used to pre-cool the reaction mixture prior to exposure of the reaction mixture to the source of ionizing radiation.

In some embodiments, the reaction mixture is sealed in a container, preferably a cylindrical container having a diameter of from about 0.5 in. (1.27 cm) to about 30 in. (76.2 cm), and then the preferably cylindrical container can be rotated about its center axis of symmetry, with the center axis parallel to the source of radiation, in order to obtain more uniform irradiation by minimizing attenuation by the contents. For example, gamma ray attenuation of about 20% occurs at the axis of a 10 in. (25.4 cm) diameter cylindrical container, and such non-uniformity is generally acceptable.

Alternatively, comparable uniformity of exposure can be achieved in larger dimensions in a rotating 24 in. (about 70 cm) diameter cylindrical drum containing a central cylindrical void region of about 16 in. (about 40.6 cm) in diameter. Such a container would provide for a greater spread in the molecular weight distribution since the free radical concentration of the contents will vary appreciably as the drum rotates.

For large-scale production, a typical batch reactor will comprise a vessel or tank constructed of material suitable for the (co)polymerization, such as glass or even stainless steel, which is commonly used for many types of free-radical (co)polymerization. Typically, the vessel will have ports for charging raw materials, removing product, emergency pressure relief, pressurizing the reactor with inert gas, pulling vacuum on the reactor head space, etc. Preferably, the vessel is at least partially enclosed in a jacket through which a heat transfer fluid (such as, for example, water) is passed for pre-cooling the contents of the vessel. Optionally, the vessel contains a stirring mechanism such as a motor-driven shaft inserted into the vessel to which stirring blades are attached.

Polymerization Methods

Typical reaction(s) with the inventive process proceed as follows. The monomer(s) are charged to the reactor in the desired amount(s). The temperature of the reaction vessel must be cool enough so that virtually no thermal (co)polymerization of the monomer(s) will occur and also cool enough so that virtually no (co)polymerization will occur when the initiator(s) are added to the reaction mixture. Also, care should be taken to ensure the reactor is dry, in particular, free of any undesired volatile solvent (such as reactor cleaning solvent), which potentially could dangerously elevate the pressure of the reaction vessel as the temperature increases due to heat of (co)polymerization. The optional photoinitiator(s), optional non-reactive diluents(s), optional nanoparticle filler(s), optional chain transfer agent(s), optional cross-linking agent(s), optional (co)polymer(s), optional organic solvent(s), etc., are also charged to the reactor.

In the methods of the present disclosure, it is presently preferred that the reaction mixture not be de-aerated before or during steps (a)-(c) of the process. Deaeration (i.e. de-oxygenation) procedures are well known to those skilled in the art of free-radical (co)polymerization. For example, deaeration is typically accomplished by bubbling (i.e. sparging) an inert gas such as nitrogen through the reaction mixture to displace dissolved oxygen.

However, in some exemplary embodiments, it may be advantageous to blanket (i.e., cover) the reaction mixture with an inert gas to reduce oxygen levels in the vapor space of the batch reactor above the reaction mixture liquid interface, in step (a), step (b), step (c), or combinations thereof. Thus, in some exemplary embodiments, the head space in the reactor may be pressurized with an inert gas such as nitrogen, helium, argon, and the like, to a level necessary to suppress boiling of the reaction mixture as the temperature rises during reaction. The inert gas pressure also prevents oxygen from entering the (co)polymerization mixture through possible small leaks in the reaction equipment while (co)polymerization is in progress.

Prior to exposing the reaction mixture to a source of ionizing radiation, it may be desirable to pre-cool the reaction mixture as described above. However, it is presently preferred that the reaction mixture not be cooled during steps (a)-(c), so that the (co)polymerization process may be carried out under substantially adiabatic conditions, more preferably adiabatic conditions.

In certain embodiments of the processes of the present disclosure, the reaction mixture is exposed to the source of ionizing radiation for only a short period of time at the beginning of step (b) sufficient to initiate the (co)polymerization reaction. In such embodiments, it may be desirable not to expose the reaction mixture to the source of ionizing radiation during all or a portion of step (c). In such embodiments, the exposure time to the source of ionizing radiation in steps (b) and/or (c) may be advantageously varied from about 1 minute to about 120 minutes, from about 5 min. to about 60 min., from about 10 min. to about 30 min., or even from about 15-20 min. In other embodiments, it may be desirable to expose the reaction mixture to the source of ionizing radiation for the entirety of step (b) and/or step (c). In such embodiments, the exposure time to the source of ionizing radiation in steps (b) and/or (c) may be advantageously varied from about 10 minutes to about 24 hours, from about 20 min. to about 12 hours, from about 30 min. to about 6 hours, or even from about 1 hour to about 3 hours.

(Co)polymerization can be carried out over a wide range of dose rates in the range of a kilorad per second to about a kilorad per hour. It is generally preferred, however, that the dose rate be kept between from 5 to about 500 kilorads per hour, between from about 10 to about 400 kilorads per hour, or even from about 20 to about 250 kilorads per hour. Dose rates below 1 kilorad per hour may result in polymers with molecular weights too high to be useful due to low tack and adhesive failure. Dose rates exceeding a few tenths of a kilorad per second may result in (co)polymers of too low molecular weight to be useful as adhesives due to cohesive failure or low creep resistance. However, some (co)polymer formulations produced above this range may find application in specialty products. In other cases, these low molecular weight (co)polymers may subsequently be cross-linked to provide sufficient cohesion.

Some exemplary processes of the present disclosure allow for careful control of both molecular weight and molecular weight distribution in the final (co)polymer, thereby allowing the practitioner to "tailor" the properties of the resulting (co)polymer, adhesive, pressure-sensitive adhesive, or hot melt pressure sensitive adhesive. Several variables can be manipulated to control the molecular weight of the final product, the most important being radiation dose rate and concentration of chain transfer agent.

Unlike the chemically initiated polymerization procedures of the prior art, in which the rate of chain initiation (and consequently molecular weight) is highly temperature dependent, the polymerization procedure of the present disclosure is relatively unaffected by temperature, except in reaction mixtures where chain transfer is an important factor. Consequently, limitations on the ability to remove heat from the reactants do not interfere substantially with the ability to control molecular weight in the processes of the present disclosure.

Although temperature is relatively less important in controlling molecular weight in the process of the present disclosure than in chemically initiated (co)polymerizations, it may nevertheless be a significant factor in viscous compositions having relatively high chain transfer to monomer coefficients such as 2-ethylhexyl acrylate and N-vinyl pyrrolidone or for compositions having relatively high concentrations of chain transfer agent. For such compositions, temperature, as well as dose rate, can be varied to obtain the desired molecular weight, with increasing temperature resulting in lower molecular weight. Thus, dose rate, chain transfer agent concentration and temperature can all be used, separately or in combination, to control molecular weight.

In low-solvent or solventless bulk (co)polymerizations, such as those used to produce some exemplary hot-melt pressure sensitive adhesives of the present disclosure, molecular weight can be controlled effectively by manipulation of composition, dose rate, and initial temperature since the viscosity buildup in the reaction mixture makes the removal of heat and control of reaction temperature difficult.

The molecular weight distribution can be controlled by varying the dose rate in a continuous or stepwise manner during the (co)polymerization reaction. It is thus possible to produce polydisperse or polymodal molecular weight distributions which make possible the production of a wide range of products having a variety of adhesive and cohesive products. For example, the (co)polymerization reaction may be carried out at a first dose rate for a period of time and then the dose rate changed for the remainder of the (co)polymerization in order to produce an essentially bimodal molecular weight distribution.

The total integrated radiation dose primarily affects the degree of conversion of the ethylenically-unsaturated material to the finished (co)polymer material. In general, it is desirable to irradiate to conversions of 95% or greater and preferably to conversions of 99.5% or higher. However, the reaction rate becomes asymptotic with time as monomer concentration is depleted, and it becomes more difficult to achieve very high conversion. Low solvent or solventless reaction mixtures are not generally preferred, since higher viscosity leads to reduced monomer reaction and lower conversion. However, solventless compositions may be polymerized using the processes of the present disclosure, to achieve very low levels of residual monomer. This is particularly important in pressure-sensitive adhesives used for medical applications, where even small amounts of residual monomer may irritate the skin.

During the asymptotic or monomer depletion stage of the reaction, radiation cross-linking will begin to occur. Radiation induced cross-linking will be more significant as solids concentration increases. Cross-linking may be minimized by the inclusion of chain transfer agent but only at the expense of obtaining lower molecular weights for the finished (co) polymer material.

There are cases where over-irradiation to achieve a degree of cross-linking may be permissible, or even desirable. Cross-links may be tolerated or even desired up to a certain density as they give greater cohesion and creep resistance. However, in too great a density, cross-linking will adversely affect product coating and performance; thus, over-irradiation must be limited. Cross-linking relative to monomer consumption near the end of the reaction is greater at higher dose rates. To achieve high degrees of conversion while preventing product deterioration, a finishing step dose rate of less than 200 kilorads per hour is preferred.

The process may be varied to produce a wide variety of (co)polymers exhibiting a broad range of final adhesive properties, among them molecular weight distribution, residual monomer concentration, cross-link density, tack, shear strength, and the like. Post application of ultraviolet or ionizing irradiation may be employed to further alter properties of the (co)polymer, particularly when used as a hot melt adhesive. Final adhesive properties will depend on both polymerization and post-application processing conditions. Products containing some degree of residual monomer may be particularly useful where post application irradiation is employed.

The higher molecular weights obtainable and pre-application cross-linking make possible the production of (meth)acrylic (co)polymer adhesives, either in solution or solventless, which require significantly less post-application curing, by either chemical or radiation processes, than many existing products.

As previously indicated, some exemplary processes of the present disclosure may be carried out in the absence or near absence of solvent to produce (meth)acrylate-based pressure-sensitive adhesives suitable for hot-melt application. As the amount of solvent in the reaction system approaches zero, reaction conditions become essentially adiabatic due to the inability to remove the heat of polymerization from the reaction mixture. Nevertheless, we have discovered that the polymerization processes of the present disclosure can be performed without de-aeration of the reaction mixture under adiabatic conditions, without a breakdown in molecular weight or creation of a runaway reaction.

Because the (co)polymerization is carried out substantially adiabatically, the heat of reaction released after initiation of the (co)polymerization process by exposure of the reaction mixture to the source of ionizing radiation acts to increase the temperature of the reaction mixture. The temperature of the reaction mixture rises to a peak temperature, then begins to drop as the supply of ethylenically-unsaturated material in the reaction mixture is converted to (co)polymer, and the (co)polymerization reaction(s) approach completion.

Once the reaction temperature has peaked, the (co)polymer content at this point is typically from about 30-90% by weight based on the total weight of ethylenically-unsaturated material and (co)polymer in the reactor. The (co)polymerization reaction cycle can be stopped at this point. Typically, the reaction mixture temperature is cooled prior to beginning the next reaction cycle or draining the reactor. Generally the reaction mixture is cooled to a temperature of from about 20-40° C.

As the partially (co)polymerized reaction mixture cools, its viscosity will increase. Optionally, if necessary, additional ethylenically-unsaturated material, for example vinyl-functional monomer(s), and/or optional non-reactive diluents (e.g. optional chain transfer agent(s), cross-linker(s), photoinitiator(s), non-volatile organic solvent(s), plasticizer(s), tackifier(s), and the like) can be added to the reaction mixture before it has fully cooled to compensate for the increasing viscosity. Typically, if necessary, a relatively small amount of additional ethylenically-unsaturated material can be added. Charging additional ethylenically-unsaturated material in an amount less than about 30 weight % of the amount of ethylenically-unsaturated material added in the first reaction cycle is preferred.

While the reaction mixture is cooling or when it has cooled to the desired temperature, optionally more ethylenically-unsaturated material can be added to adjust for unequal reactivity ratios of the ethylenically-unsaturated materials used in the previous reaction cycle. Similarly, ethylenically-unsaturated material not included in an earlier reaction cycle can be added to tailor the (co)polymer properties as needed. Ethylenically-unsaturated material addition may also be performed as an in-process correction to compensate for slight batch-to-batch variations in the amount of (co)polymerization reaction conversion obtained in a previous reaction cycle.

Additionally or alternatively, once the reaction mixture has cooled to the desired temperature, an optional photoinitiator(s) may be added to the reaction mixture. Optionally, additional chain transfer agent(s) can be added. Adjusting the amount of chain transfer agent can provide an in-process correction for the product molecular weight obtained from the previous reaction cycle. Other additives, including other non-reactive diluents (e.g., optional chain transfer agent(s), cross-linker(s), photoinitiator(s), non-volatile organic solvent(s), plasticizer(s), tackifier(s), and the like), can also be added at this time.

Optionally, additional additives including but not limited to those selected from the group consisting of plasticizers, tackifiers, antioxidants, stabilizers, fillers, and mixtures thereof, can be added at this time by mixing one or more of them into the molten (co)polymer product. The identity and relative amounts of such components are well known to those skilled in the art.

For example, the antioxidant/stabilizer sold under the trade designation IRGANOX 1010 (tetrakis(methylene(3,5-di-tert-butyl-4-hydroxyhydrocinnamate))methane), manufactured by Ciba Specialty Chemicals, a subsidiary of BASF Corp. (Florham Park, N.J.), can be mixed into the (co)polymer to increase the temperature stability of the (co)polymer. Antioxidant is typically used in the range of about 0.01% to about 1.0% based on the total weight of the (co)polymer product.

The reaction mixture's viscosity at the temperature at the end of the final reaction cycle is preferably less than about 200,000 to about 500,000 centipoise (Brookfield viscosity at draining temperature) to permit draining of the molten (co)polymer from the reactor and optionally mixing additives into the reaction mixture. Typically, inert gas (such as nitrogen) pressure in the head space of the reactor can be used to hasten the draining of the product from the reactor.

If desired, additional reaction cycles can be performed by repeating steps (a)-(c) to continue increasing conversion to the desired level.

After the reaction mixture is drained, an apparatus such as an extractor-extruder can be used to strip unreacted monomer and/or any organic solvent that optionally was added to the reaction mixture, or further process the (co)polymer by mixing in additives comprising plasticizers, tackifiers, antioxidants and/or stabilizers and/or other non-reactive diluents, and extruding the (co)polymer into the physical form that it is intended to be used (i.e., in sheet form for a PSA).

In some exemplary embodiments, the mixture at the completion of the polymerization step (c) has a concentration of the free radically (co)polymerizable ethylenically-unsaturated material less than 1% by weight of the total weight of the mixture at the beginning of the polymerization step (c). In certain exemplary embodiments, the mixture at the completion of the polymerization step (c) has a gel content less than 10% by weight, based on the total weight of the mixture at the beginning of the polymerization step (c).

In certain presently preferred embodiments, the (co)polymer formed at the completion of the polymerization step (c) is a pressure-sensitive adhesive that exhibits a FOG value, determined according to VDA-278 (by heating the adhesive sample to a temperature of 90° C. for 30 minutes and measuring the amount of volatile organic compounds released using gas chromatography/mass spectroscopy), of no more than 1,000 µg/g, and optionally a VOC value, determined according to VDA-278, of no more than 2,000 µg/g.

In some exemplary embodiments of a pressure sensitive adhesive, the optical activity of the at least partially (co)polymerized (co)polymer is substantially identical to that of the mixture comprising the free radically (co)polymerizable ethylenically-unsaturated material.

Pressure Sensitive Adhesive Articles

In certain exemplary embodiments, the pressure sensitive adhesive is applied to a major surface of a substrate as at least one layer of the pressure sensitive adhesive on the major surface of the substrate. Preferably, the pressure sensitive adhesive layer has a thickness of at least 5 micrometers, 10 µm, 25 µm, 50 µm, 100 µm, 200 µm, 300 µm, 400 µm, 500 µm, 750 µm, or even 1 mm; and no more than 5 mm, 2 mm, 1 mm, 750 µm, 500 µm, 400 µm, 300 µm, 250 µm, or even 100 µm.

In a preferred embodiment, the adhesive is a pressure sensitive adhesive at 25° C. In another preferred embodiment, a hot melt coated mixture of the adhesive and the packaging material is a pressure sensitive adhesive at 25° C. and has a storage modulus when measured in torsional shear at 25° C. and at 1 radian/second of between about $10^4$ and about $10^7$ dynes/cm$^2$. The (co)polymerized adhesives of the invention preferably have a storage modulus (G') when measured in torsional shear at 25° C. and at 1 second (or frequency of 1 radian/second) between about $10^4$ and $10^8$ dynes/cm$^2$ and more preferably between about $10^4$ and $10^7$ dynes/cm$^2$.

The (co)polymerized adhesives may be used to make a coatable thermoplastic or thermosettable hot melt adhesive by introducing the adhesive and its packaging material into a vessel in which the adhesive and its packaging material are melted. This hot melt adhesive may be used to form a pressure sensitive adhesive sheet by coating the melted adhesive and its packaging material onto a sheet material or another suitable substrate. The sheet material is preferably selected from a tape backing or a release liner.

Preferably, the polymerized adhesives are hot melt coated by putting the packaged adhesive in a hot melt coater at a temperature sufficient to melt the packaged adhesive and with sufficient mixing to form a coatable mixture, which is coated onto a substrate. This step can be done conveniently in a heated extruder, bulk tank melter, melt-on-demand equipment, or a hand-held hot melt adhesive gun. If a crosslinking agent or photoinitiator is added, the coated adhesive can then be exposed to sufficient UV radiation or ionizing radiation during subsequent coating or processing to effect the crosslinking. Crosslinking is preferably initiated after coating.

The steps may be done in-line, i.e., the pre-adhesive composition may be surrounded by the packaging material, polymerized, hot melt coated to form a tape, and optionally crosslinked, or the steps may be performed individually at separate times and sites. For example, the packaged pre-adhesive composition may be polymerized at one time and extruded and crosslinked at another time.

In one exemplary embodiment, a tape is formed in which the substrate is a tape backing Typical tape backings include cellulosic materials such as paper, crepe paper, and cloth (including both woven and non-woven cloths); films such as biaxially oriented polyester, polyvinyl chloride, polyurethane, biaxially and monoaxially oriented polypropylene, nylon; foam materials such as polyethylene foams and acrylic foams; and metal foils such as aluminum foil. The backings are usually treated on the back side with a release coating such as silicone, and may be treated prior to hot melt coating to enhance the adhesion of the adhesive to the backing Treatments useful for enhancing the adhesion of the adhesive to the backing include chemical priming and corona treatment.

In another exemplary embodiment, a transfer tape is formed wherein the substrate is a release liner. The release liner can be coated on one or both sides with a release coating, and the transfer tape is removed from the substrate when used by the end user.

In yet another embodiment, the substrate is the surface of a part to be bonded to another part with the hot melt adhesive. In another embodiment of the invention, the adhesive or a tape made out of the adhesive is used to damp vibrations or as a sealant. Additionally, the adhesive can be coated on one or both sides of a backing to form a double-coated tape.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

These examples are merely for illustrative purposes and are not meant to be limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials

Table 1 presents a listing of the materials used in the Examples. All parts, percentages, ratios, and the like in the examples and the rest of the specification are by weight, unless noted otherwise. Solvents and other reagents used may be obtained from Sigma-Aldrich Chemical Company (Milwaukee, Wis.) unless otherwise noted.

TABLE 1

| Material | Chemical Composition | Source |
| --- | --- | --- |
| AA | Acrylic Acid | BASF, Florham Park, NJ |
| IOA | Isooctyl acrylate | 3M Company, St. Paul, MN |

TABLE 1-continued

| Material | Chemical Composition | Source |
| --- | --- | --- |
| 2-EHA | 2-ethyl hexyl acrylate | BASF, Florham Park, NJ |
| IOTG | Isooctylthioglycoate | Dow Chemical, Midland, MI |
| MMA | Methyl methacrylate | Sigma-Aldrich Chemical, Milwaukee, WI |
| NNDMA | N,N-Dimethylacrylamide | Sigma-Aldrich, Milwaukee, WI |

Test Methods

The test methods used in the Examples are described further below.

Monomer Residuals

Monomer residuals were measured using an NIR procedure. The IR signature (wavelength and response factor) of each monomer was calibrated to absolute content, which enables quantitative measurement of residuals (in wt. %).

Gel Content

Gel content was determined by immersing the samples, enclosed in wire mesh cages, in ethyl acetate for 24 hours to extract any soluble (co)polymer chains. The percent gel reported is the portion of the total mass remaining after attempted dissolution.

Experimental Apparatus

The experimental apparatus used to irradiate the reaction mixtures in the currently described Examples was a Nordion JS-10000 Hanging Tote Irradiator manufactured by Nordion Corp. (Ottawa, Ontario, Canada).

The irradiation with gamma rays as a source of ionizing radiation was accomplished using a source strength of 1.5 to 3 MCi from a source consisting of a series of hollow stainless steel tubes containing Co-60 ($^{60}Co$). Generally, mid-way through the dose exposure of multiple samples, the samples were retrieved from the irradiation chamber, and the relative position reversed to provide a more uniform exposure. The samples were conveyed into the irradiation chamber and exposed to gamma rays for periods of time necessary to achieve the desired dose.

Sample Preparation and Dose

Samples were generated by exposure of the monomer mixtures to gamma radiation. The dose (energy/mass) delivered to each sample was measured with B3 DoseStix radiochromic thin film dosimeters which were evaluated shortly after irradiation. The total absorbed doses ranged from 5 to 20 kGy, and dose rates were about 0.0005 to 0.005 kGy/sec.

Samples were prepared by metering the monomer mixture into 25 g to 5-gallon (about 19.5 liter) containers, with care taken to ensure the container contained as little air as possible.

Example 1: 2-EHA/AA/IOTG

A monomer mixture of 96.5 wt. % 2-EHA, 3.46 wt. % AA, and 0.04 wt. % IOTG was prepared. The monomer mixture was metered to completely fill a ½ gallon can (about 1.95 liter), taking care to eliminate as much headspace as possible. The container was exposed to gamma radiation to a dose of 7.6 kGy. The resulting sample had monomer residuals of 1.39 wt. %.

Example 2: 2-EHA/AA/IOTG

A monomer mixture of 96.5 wt. % 2-EHA, 3.38 wt. % AA, and 0.12 wt. % IOTG was prepared. The monomer mixture was metered to completely fill a ½ gallon can (about 1.95 liter), taking care to eliminate as much headspace as possible. The container was exposed to gamma radiation to a dose of 6.6 kGy. The resulting sample had monomer residuals of 2.19 wt. %.

Example 3: IOA/IOTG

A monomer mixture of 99.88 wt. % IOA and 0.12 wt. % IOTG was prepared. The monomer mixture was metered to completely fill a pint can (about 487 ml), taking care to eliminate as much headspace as possible. The container was exposed to gamma radiation to a dose of 5.4 kGy. The resulting sample had monomer residuals of 1.84 wt. %.

Example 4: MMA

MMA monomer was metered to completely fill a 30 g glass vial, taking care to eliminate as much headspace as possible. The container was exposed to gamma radiation to a dose of 18.7 kGy. The resulting sample was a solid slug upon removal from the glass vial.

Example 5: IOA/AA/IOTG

A monomer mixture of 96.5 wt. % IOA, 3.42 wt. % AA, and 0.08 wt. % IOTG was prepared. Three gallons of the monomer mixture was metered into a 5-gallon bucket (about 19.5 liter). The remaining headspace was purged with 20 psi of UHP $N_2$ for 4 minutes to eliminate oxygen. The container was then exposed to gamma radiation to a dose of 6.3 kGy. The resulting sample had monomer residuals of 2.68 wt. % and a gel content of 2 wt. %.

Example 6: 2-EHA/AA/Aerosil 200/IOTG

A monomer mixture of 91.5 wt. % 2-EHA, 3.5 wt. % AA, 4.92 wt. % Aerosil 200, and 0.08 wt. % IOTG was prepared. The monomer mixture was metered to completely fill a ½ gallon (about 1.95 liter) can, taking care to eliminate as much headspace as possible. The container was then exposed to gamma radiation to a dose of 7.4 kGy. The resulting sample had monomer residuals of 2.94 wt. % and a gel content of 1.46 wt. %.

Example 7: 2-EHA/AA/NNDMA/IOTG

A monomer mixture of 90 wt. % 2-EHA, 4.96 wt. % AA, 5 wt. % NNDMA, and 0.04 wt. % IOTG was prepared. Three gallons of the monomer mixture was metered into a 5-gallon gallon (about 19.5 liter) bucket. The remaining headspace was purged with 20 psi of UHP $N_2$ for 4 minutes to eliminate oxygen. The container was then exposed to gamma radiation to a dose of 17.0 kGy. The resulting sample had monomer residuals of 2.84 wt. % and a gel content of 0.72 wt. %.

Table 2 presents a summary of the formulations and properties of the samples obtained in the Examples.

TABLE 2

| Example | (Co)polymer Designation | Composition (wt %) | Dose (kGy) | Residual Monomer Level (wt %) | Gel Content (wt %) |
|---|---|---|---|---|---|
| 1 | 2-EHA/AA/IOTG | 96.5/3.46/0.04 | 7.6 | 1.39 | — |
| 2 | 2-EHA/AA/IOTG | 96.5/3.38/0.12 | 6.6 | 2.19 | — |
| 3 | IOA/IOTG | 99.88/0.12 | 5.4 | 1.84 | 7 |
| 4 | MMA | 100 | 18.7 | — | — |
| 5 | IOA/AA/IOTG | 96.5/3.42/0.08 | 6.3 | 2.68 | 2 |
| 6 | 2-EHA/AA//IOTG/Aerosil200 | 91.5/3.5/0.08/4.92 | 7.4 | 2.94 | 1.46 |
| 7 | 2-EHA/AA/NNDMA/IOTG | 90/4.96/5/0.04 | 17.0 | 2.84 | 0.72 |

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. The particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this present disclosure is not to be unduly limited to the illustrative embodiments set forth hereinabove. Furthermore, all publications, published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following claims.

The invention claimed is:

1. A method comprising:
   (a) providing a non-deaerated mixture comprising free radically (co)polymerizable ethylenically-unsaturated material in a batch reactor;
   (b) exposing the non-deaerated mixture to a source of ionizing radiation for a time sufficient to initiate (co)polymerization of at least a portion of the free radically (co)polymerizable ethylenically-unsaturated material; and
   (c) allowing the free radically (co)polymerizable ethylenically-unsaturated material to (co)polymerize under essentially adiabatic conditions while continuing to expose the mixture to the source of ionizing radiation for a time sufficient to yield an at least partially (co)polymerized (co)polymer, wherein the mixture is non-heterogeneous and substantially free of thermally-induced (co)polymerization initiators.

2. The method of claim 1, wherein the source of ionizing radiation is selected from a gamma ray source, an x-ray source, an electron beam source having an emission energy of greater than 300 keV, and combinations thereof.

3. The method of claim 1, wherein the mixture is blanketed with an inert gas to reduce oxygen levels in a vapor space of the batch reactor in step (a), step (b), step (c), or combinations thereof.

4. The method of claim 1, wherein the mixture further comprises a chain transfer agent.

5. The method of claim 1, wherein the concentration of chain transfer agent in the mixture is from 0.01% to 20% by weight, based upon the total weight of the mixture.

6. The method of claim 1, wherein the mixture is exposed to ionizing radiation for a time sufficient to receive a dose of ionizing radiation up to 100 kiloGray.

7. The method of claim 1, wherein the mixture further comprises a photoinitator.

8. The method of claim 1, wherein the free radically (co)polymerizable ethylenically-unsaturated material is comprised of vinyl-functional monomers, vinyl-functional oligomers, vinyl-functional macromers, or a combination thereof.

9. The method of claim 1, wherein the free radically (co)polymerizable ethylenically-unsaturated monomers are comprised of difficult to (co)polymerize monomers selected from N-vinyl pyrrolidone, N,N-dimethyl acrylamide, (meth)acrylic acid, acrylamide, N-octyl acrylamide, styrene, vinyl acetate, and combinations thereof.

10. The method of claim 1, wherein the mixture further comprises a non-reactive diluent selected from the group consisting of plasticizers, tackifiers, particulate fillers, non-volatile organic solvents, and combinations thereof.

11. The method of claim 10, wherein the non-reactive diluent is selected from a plasticizer.

12. The method of claim 10, wherein the non-reactive diluent is selected from a tackifier.

13. The method of claim 10, wherein the non-reactive diluent is selected from a particulate filler.

14. The method of claim 10, wherein the non-reactive diluent is added at a level of about 1% to about 25% by weight, based upon the total weight of the mixture.

15. The method of claim 1, wherein the mixture has a concentration of the free radically (co)polymerizable ethylenically-unsaturated monomers less than 3% by weight of the total weight of the mixture, at the completion of step (c).

16. The method of claim 1, wherein the mixture has a gel content less than 10% by weight, based on the total weight of the mixture, at the completion of step (c).

17. A pressure sensitive adhesive prepared according to claim 1, wherein the pressure-sensitive adhesive exhibits a FOG value, determined according to VDA-278, of no more than 1,000 µg/g.

18. The pressure sensitive adhesive of claim 17, wherein the at least partially (co)polymerized (co)polymer exhibits an optical activity substantially identical to an optical activity of the mixture comprising free radically (co)polymerizable ethylenically-unsaturated material.

19. A pressure sensitive adhesive article incorporating the pressure sensitive adhesive of claim 17, wherein the pressure sensitive adhesive article comprises at least one layer of the pressure sensitive adhesive on a major surface of a substrate.

* * * * *

UNITED STATES PATENT AND TRADEMARK OFFICE
CERTIFICATE OF CORRECTION

PATENT NO. : 9,708,514 B2  
APPLICATION NO. : 14/647924  
DATED : July 18, 2017  
INVENTOR(S) : Sasha Myers et al.

Page 1 of 2

It is certified that error appears in the above-identified patent and that said Letters Patent is hereby corrected as shown below:

On the Title Page

<u>Column 2 item (57) (Abstract)</u>  
Line 19, Delete "x ray" and insert -- x-ray --, therefor.

In the Specification

<u>Column 2</u>  
Line 1, Delete "unstaturated" and insert -- unsaturated --, therefor.

<u>Column 3</u>  
Lines 11-12, Delete "photoinitator." and insert -- photoinitiator. --, therefor.  
Line 55, Delete "diluent. the" and insert -- diluent. The --, therefor.

<u>Column 7</u>  
Line 31, After "homogeneous"" insert -- . --.

<u>Column 14</u>  
Line 48, Delete "photoinitator." and insert -- photoinitiator. --, therefor.

<u>Column 15</u>  
Line 14, Delete "DAROCURE" and insert -- DAROCUR --, therefor.  
Line 17, Delete "DAROCURE" and insert -- DAROCUR --, therefor.

<u>Column 17</u>  
Line 24, Delete "Tacklers" and insert -- Tackifiers --, therefor.

<u>Column 25</u>  
Line 67, After "backing" insert -- . --.

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,708,514 B2

Column 26
Line 10, After "backing" insert -- . --.

In the Claims

Column 30
Line 27, In Claim 7, delete "photoinitator." and insert -- photoinitiator. --, therefor.